US006370845B1

(12) United States Patent
Kokkersvold et al.

(10) Patent No.: US 6,370,845 B1
(45) Date of Patent: Apr. 16, 2002

(54) BELT DEVICE FOR FORMING A PACKAGING ARRANGEMENT INCLUDING AT LEAST TWO STACKS OF GOODS AND A METHOD OF FORMING THE PACKAGING ARRANGEMENT

(75) Inventors: Tor Kokkersvold, Langangen; Bjarne Omdal, Skien; Geir Viktor Gundersen, Porsgrunn, all of (NO); Jens Bejlegaard Jensen, Vodskov; Bent Østergaard, Aalborg Ost, both of (DK)

(73) Assignee: Norsk Hydro ASA, Oslo (NO)

( * ) Notice: Subject to any disclaimer, the term of this patent is extended or adjusted under 35 U.S.C. 154(b) by 0 days.

(21) Appl. No.: 09/996,678

(22) Filed: Nov. 30, 2001

Related U.S. Application Data

(62) Division of application No. 09/331,318, filed on Aug. 30, 1999.

(30) Foreign Application Priority Data

Dec. 18, 1996 (NO) ............................................... 965438

(51) Int. Cl.[7] ................................................. B65G 3/02

(52) U.S. Cl. ............................ 53/452; 53/147; 53/443; 53/466; 53/531; 53/540; 53/582; 53/586; 53/591; 493/226

(58) Field of Search .......................... 53/147, 443, 447, 53/452, 531, 540, 543, 582, 590, 591, 466, 586; 493/226

(56) References Cited

U.S. PATENT DOCUMENTS

| | | | | |
|---|---|---|---|---|
| 1,401,520 | A | * | 12/1921 | Clauss |
| 2,910,814 | A | * | 11/1959 | Yelinek |
| 4,617,784 | A | * | 10/1986 | Golicz et al. |
| 4,811,548 | A | * | 3/1989 | Reist |
| 5,058,363 | A | * | 10/1991 | Focke et al. |
| 5,129,211 | A | * | 7/1992 | Anderson |
| 5,168,989 | A | * | 12/1992 | Benno |
| 6,059,181 | A | * | 5/2000 | Marbry et al. |

FOREIGN PATENT DOCUMENTS

| | | | |
|---|---|---|---|
| DE | 2248401 | * | 4/1973 |
| EP | 0194072 | * | 9/1986 |
| FR | 1247293 | * | 10/1960 |
| GB | 1409243 | * | 10/1975 |
| GB | 1463055 | * | 2/1977 |
| GB | 2 010 776 | * | 7/1979 |
| WO | 8806554 | * | 9/1988 |

* cited by examiner

*Primary Examiner*—Rinaldi I. Rada
*Assistant Examiner*—Christopher Harmon
(74) *Attorney, Agent, or Firm*—Wenderoth, Lind & Ponack, L.L.P.

(57) ABSTRACT

A belt device for forming a packaging arrangement including at least one stack of goods has a sling that includes a central suspension loop. The belt is formed as a closed loop and has a width substantially equal to the transverse width of the stack.

9 Claims, 11 Drawing Sheets

BELT DEVICE FOR FORMING A PACKAGING ARRANGEMENT INCLUDING AT LEAST TWO STACKS OF GOODS AND A METHOD OF FORMING THE PACKAGING ARRANGEMENT

This application is a Divisional of Ser. No. 09/331,318 filed Aug. 30, 1999.

BACKGROUND OF THE INVENTION

The present invention relates to a parcel (i.e., packaging arrangement) of at least one pair of stacks of units of goods surrounded by a self-clamping sling. The invention also comprises a prefabricated sling for forming such parcels. The invention further comprises a method of forming such parcels comprising a self-clamping load sling and an apparatus for performing the method.

Transport and storage of units of goods or bags are, to a great extent, performed by stacking the goods on pallets which usually are covered and protected/secured by foliar plastic sheet. This is a rather expensive procedure, mainly because of the cost of the pallets, including the cost of reusing, refurbishing, repairing and transporting the pallets.

Proposals for overcoming these problems by using slings instead of pallets are known. From WO 88/06554 there is known a process and machine for making up a parcel of bags from adjacent stacks of bags and two straps forming, a closed loop. The straps encircle the stacks of bags, transversally with respect to the bags, and the lower part of the straps extends upwards between the stacks of bags to form a central suspension loop for lifting the parcel. The application of a pair of straps complicates the handling of such parcels because it requires two suspension loops to be hooked onto lifting devices like hooks or truck forks. The stability of such parcels is questionable and the narrow width of the straps will, for many types of goods, damage the bags during handling. The openings in the straps through which the suspension loops protrude are complicated, and it requires strict control to ensure that the strap ends are kept together during handling.

A similar arrangement for handling stacks of bags is described in GB patent specification No. 1.409.243. In this case, two sets of loop-formed straps surround the bags, but the common suspension loop for lifting the parcel of bags is threaded through a ring to which the strap ends are secured. This arrangement is even more complicated than that described above. The disadvantages with regard to stability and possible damage to the bags are similar to those described with respect to WO 88/06544.

SUMMARY OF THE INVENTION

The objective of the invention is to provide a safe and economic way of handling units of goods or bags that would not require pallets and which did not have the disadvantages related to known sling devices for handling bags.

Another objective is to develop a method and apparatus for placing the bags in a lifting and storage device that meets the requirements with regard to safety and stability for parcels (packaging arrangements) of stacks of bags to be handled by commonly applied lifting devices.

A further objective is to obtain an improvement in the sling device itself by providing a more efficient way of forming the sling.

When the inventors started looking for new ways of avoiding the application of pallets for transporting/storing bags, the concept of self-clamping slings seemed promising in spite of the disadvantages and shortcomings of the known solutions within this concept. It was therefore decided to try to develop improved sling type lifting devices for bags. The problems related to the application of narrow straps were first investigated. Substitution of such straps with a wide belt or cloth, for instance, one having a width substantially equal to the length of the bags, was then proposed. However, such a solution seemed to result in several new problems. First of all was the problem of joining the ends of such a belt to a joint that would be strong enough to meet the requirements with regard to lifting strength through the lifetime of the belt, i.e., through several lifting operations. Another problem was to gather together a wide belt to form a suspension loop for lifting the stacks of bags. Then an opening had to be made in the belt for the lifting loop without reducing the lifting strength of the looped belt. The latter problem proved to be very simple to solve by simply slitting an opening in the belt in the area just above the two self-clamping stacks of bags.

To make a strong joint for the belt ends required selection of the right material for the belt and the proper way of forming the joint. The belt could be made from any cloth material having the required strength, and such material could be polypropylene, polyethylene, jute and even paper. Sewing, application of various types of glue, hot melt etc. were considered. The belt ends could also be joined by a clamping device consisting of a female and male member. In this way, the belt ends are folded around the respective male and female members until they are locked together. Weldable materials can also be joined by welding. The final solution to this problem would also have to incorporate a solution taking into consideration the method of forming the looped belt with bags stacked therein. Accordingly, a new method and device for placing the bags in such a looped belt had to be developed. In order to arrive at an economically acceptable solution, it was decided that the problem of designing a device for stacking bags into the belt had to be developed simultaneously with solving the problems of obtaining a secure and permanent joint between the belt ends.

The method of forming parcels of self-clamping load sling of stacks of units of goods or bags according to the invention, comprises using a sling in the form of a belt having a width substantially equal to the transverse width of the stacks. The sling is formed into a closed loop comprising a suspension loop for lifting the parcel. A predefined length of the belt is first formed from a belt supply, and then at least two stacks of units of goods are placed on the belt such that the belt surrounds the stacks and extends upwards between the stacks to form a tapered central suspension loop. An opening is provided in the belt for pulling the loop through and then forming the loop and thus the lifting means or eye. The two ends of the belt are joined together to form a closed loop.

A modification according to the method of the present invention is shown in FIGS. 7–11. The main features of this method relate to formation of the central suspension loop and placement of a sleeve around the loop.

A special way of forming the sling was developed. This required treating the belt material, or at least those parts which should be joined together, by irradiation or corona discharge. The adherence of the glue or hotmelt to the belt material was then substantially strengthened. This solution to the problem proved to provide belt joints that could endure the strain the parcels were exposed to during lifting. The joints were strong enough even during lifting at relatively high temperatures. It was further found that when a retaining agent such as a sleeve was applied around the suspension loop, the sleeve material could be made from corona treated base material and glue, or hotmelt could be applied for joining the material to a sleeve. Similar material, such as woven polypropylene fabric, is usually applied for, for instance, making flexible intermediate bulk containers, and instead of using seems for joining the various parts of the material, it can be treated with corona discharge and glue and hotmelt can be applied to the joints.

An alternative method of forming the parcels of units of goods comprises using a predefined length of a belt having a width substantially equal to the width of the stacks of units of goods. The belt is formed into a closed loop by placing the belt over four rods being transverse to the belt, forming the central suspension loop, and then placing the belt around another set of four rods and joining the two belt ends into a closed sling. An opening in the upper part of the belt is provided for pulling the suspension loop through and gathering the loop to form a lifting eye. The units of goods are stacked into the belt subsequent to formation of the closed sling.

The apparatus for forming a parcel of at least two stacks of units of goods surrounded by a sling comprises a supply of loop material in the form of a belt or cloth which during production of the parcel of stacks will pass over two pair of rods spaced apart. Each such pair of rods has a vertically displaceable rod placed between the rods for providing, together with a vertically movable plate with two rods secured thereto, the predefined length of the belt. The outer end of the belt is fastened in a clamping device during the whole stacking operation.

At the end of the operation, the clamping device can be moved horizontally above the stack of bags in order to place the outer end of the belt in position for being joined to the other end of the belt. The apparatus further comprises a device for supplying units of goods to be stacked in the sling. Any suitable device for placing the units or bags on the belt and subsequently on the previous bag can be applied. The device also comprises at least two roll assemblies on which the predefined belt rests during the stacking operation. These roll assemblies can be moved vertically.

The parcel according to the invention comprises at least one pair of stacks of units of goods surrounded by a loop-formed sling comprising a tapered central suspension loop extending upwards between the stacks of units of goods. The sling is in the form of a closed loop of a belt having a width substantially equal to the transverse width of the stacks, and the central loop is gathered together to form a lifting eye, which optionally can be reinforced by a sleeve of suitable material. The belt ends overlap, preferably across their total width, and are permanently secured together by sewing, gluing, hot melt etc.

A corresponding parcel can be made by simply placing a pre-defined length of a belt over eight rods and joining the two ends of the belt on top of the stacks of units of goods or bags. The bags can be loaded into the belt manually.

BRIEF DESCRIPTION OF THE DRAWINGS

The invention and its special features are further explained and shown in connection with the figures briefly described below and the following detailed description thereof.

DETAILED DESCRIPTION OF THE INVENTION

Figure 1:
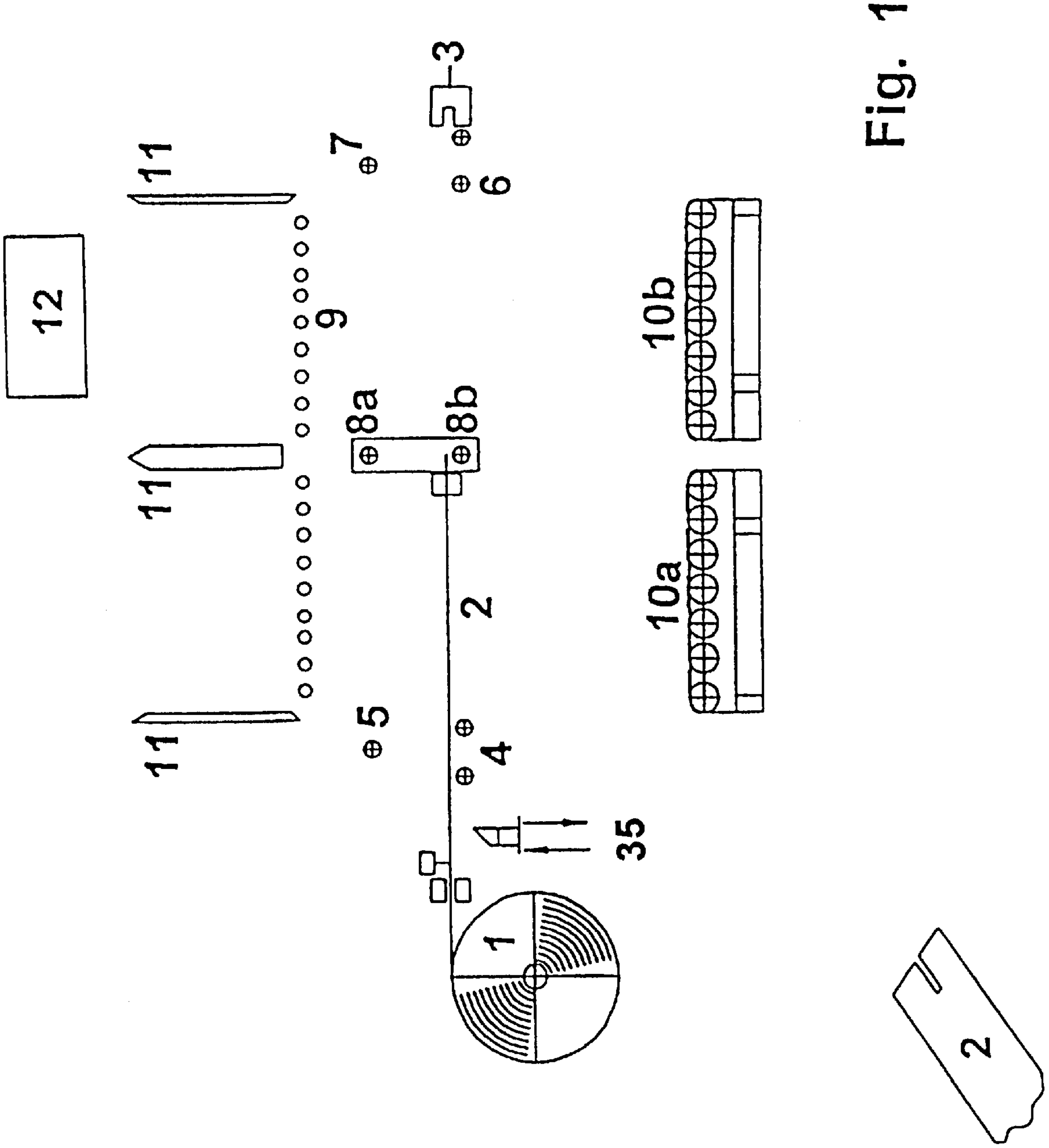
FIG. 1 shows the first step in the production of a parcel of two stacks of units of goods surrounded by a self-clamping sling.

In FIG. 1 there is shown a supply roll 1 for the continuous belt 2 to be formed into the load sling. The belt 2 passes over a first pair of transverse rods 4, which are spaced apart with a first opposing rod 5 located above and in between the transverse rods 4. A vertical movable plate 8 with a first rod 8*b* and 8*a,* a second rod and a second pair of transverse rods 6, spaced apart with a second opposing rod 7 located above and in between the rods 6. The end of the belt 2 is fastened in a clamping device 3. Below the belt 2 are first and second vertically movable roll assemblies 10*a, b*. Above the belt 2 are removable rods 9 which can be removed during the process. Above the removable rods 9 there are three partition walls 11 between which units of goods shall be stacked. A loading device 12 for supplying units of goods to be stacked is shown. The device 12 can be any suitable device for supplying the units of goods to the apparatus for forming stacks of such units surrounded by a sling formed from the belt 2. A knife 35 is placed immediately below the belt 2 adjacent to the belt supply 1. At the very beginning of the sling forming operation the knife 35 is raised vertically to make a central slit in the belt 2.

In the lower left corner of FIGS. 1–5 a perspective view of the arrangement of the belt 2 is shown with respect to each of the successive unit operations.

Figure 2:
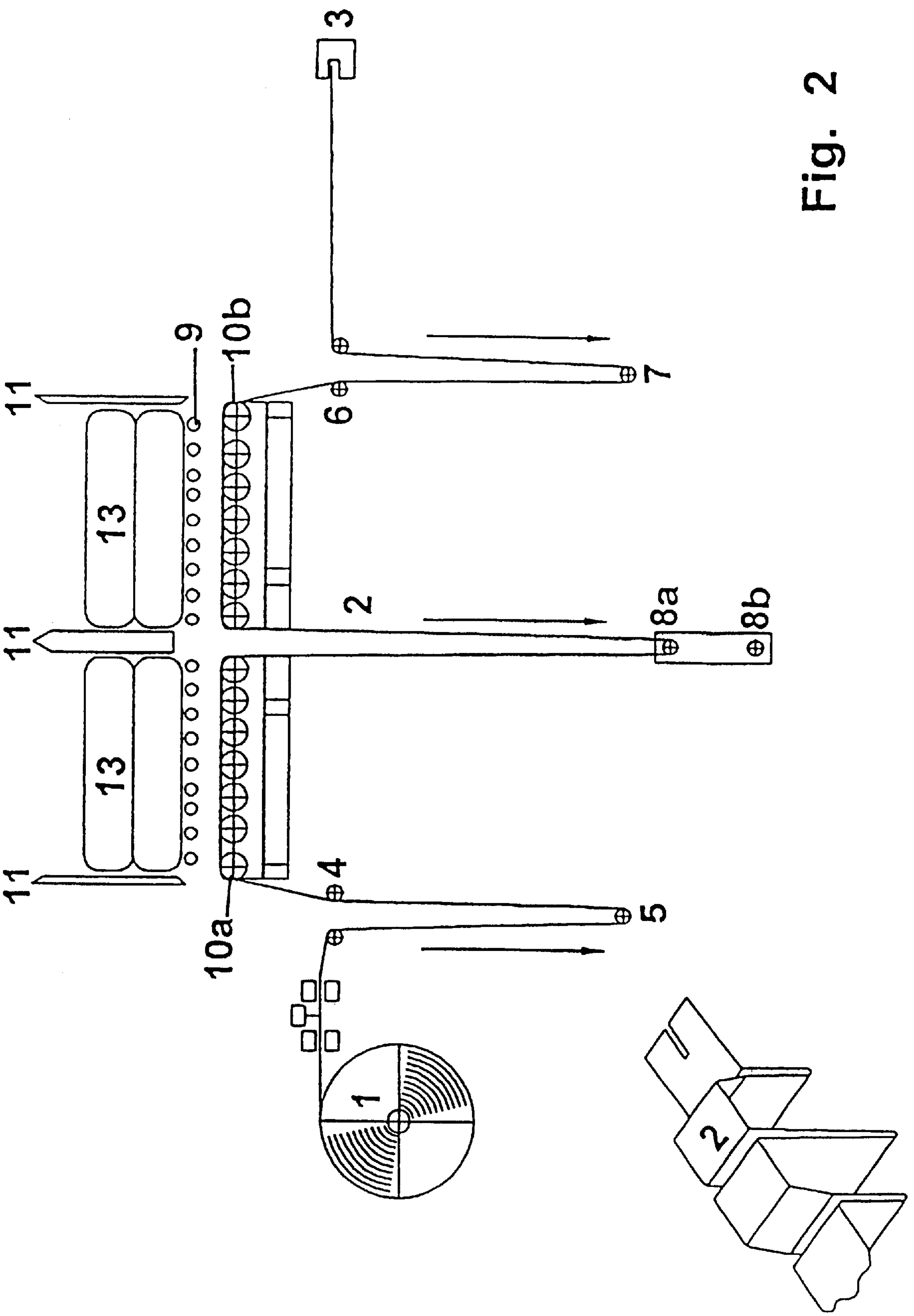
FIG. 2 shows formation of the predefined length of the sling.

FIG. 2 shows the belt 2 stretched out to its pre-defined length. This is attained by moving the first opposing rod 5, the plate 8, and the second opposing rod 7 downward, and simultaneously placing the first and second roll assemblies 10*a, b* in their starting position for stacking of units of goods, whereby the belt 2 is stretched out to its pre-defined length. The belt portions resting on the respective first and second roll assemblies 10*a* and 10*b,* and locked in these positions, will form the bottom parts of the sling for the respective stacks of bags 13. The belt supply 1 is then locked until the production of the parcel of stacks of bags is concluded. The form of the thus pre-defined belt 2 is shown more clearly in the lower left corner of FIG. 2. Units of goods or bags 13 are then loaded successively between the partition walls 11 and down on the rods 9 and subsequently onto the preceding bag 13.

Figure 3:
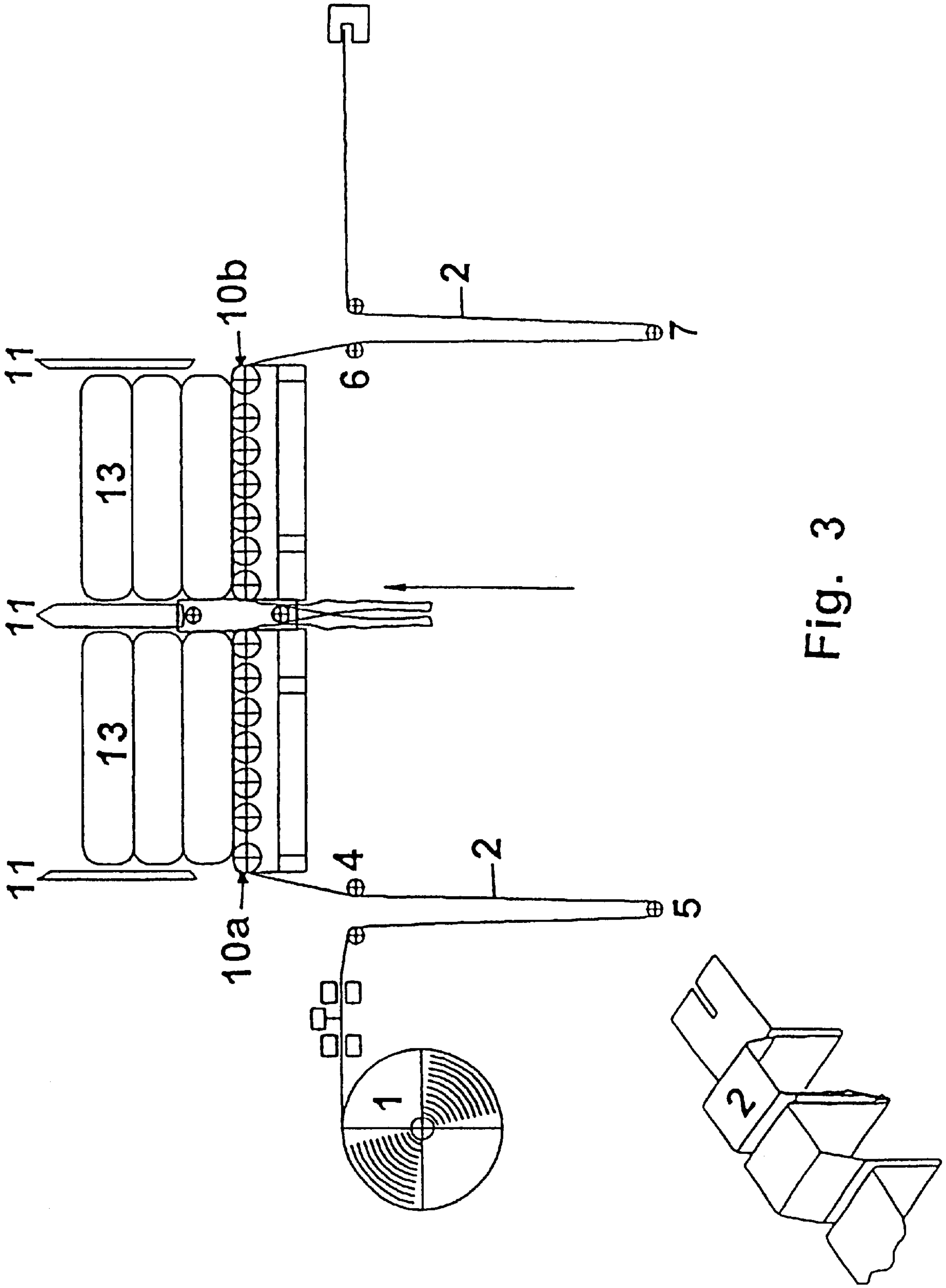
FIG. 3 shows the production step at which the first units of goods have been stacked on to the belt forming the sling.

FIG. 3 shows a further step in the production of parcels of stacks of bags. The rods 9 have now been removed and the bags rest on the belt 2 on the first and second roll assemblies 10*a, b*. The plate 8 is moved upwards bringing with it by means of the rod 8*b* the section of the belt 2 between roll assemblies 10*a* and 10*b*.

Figure 4:
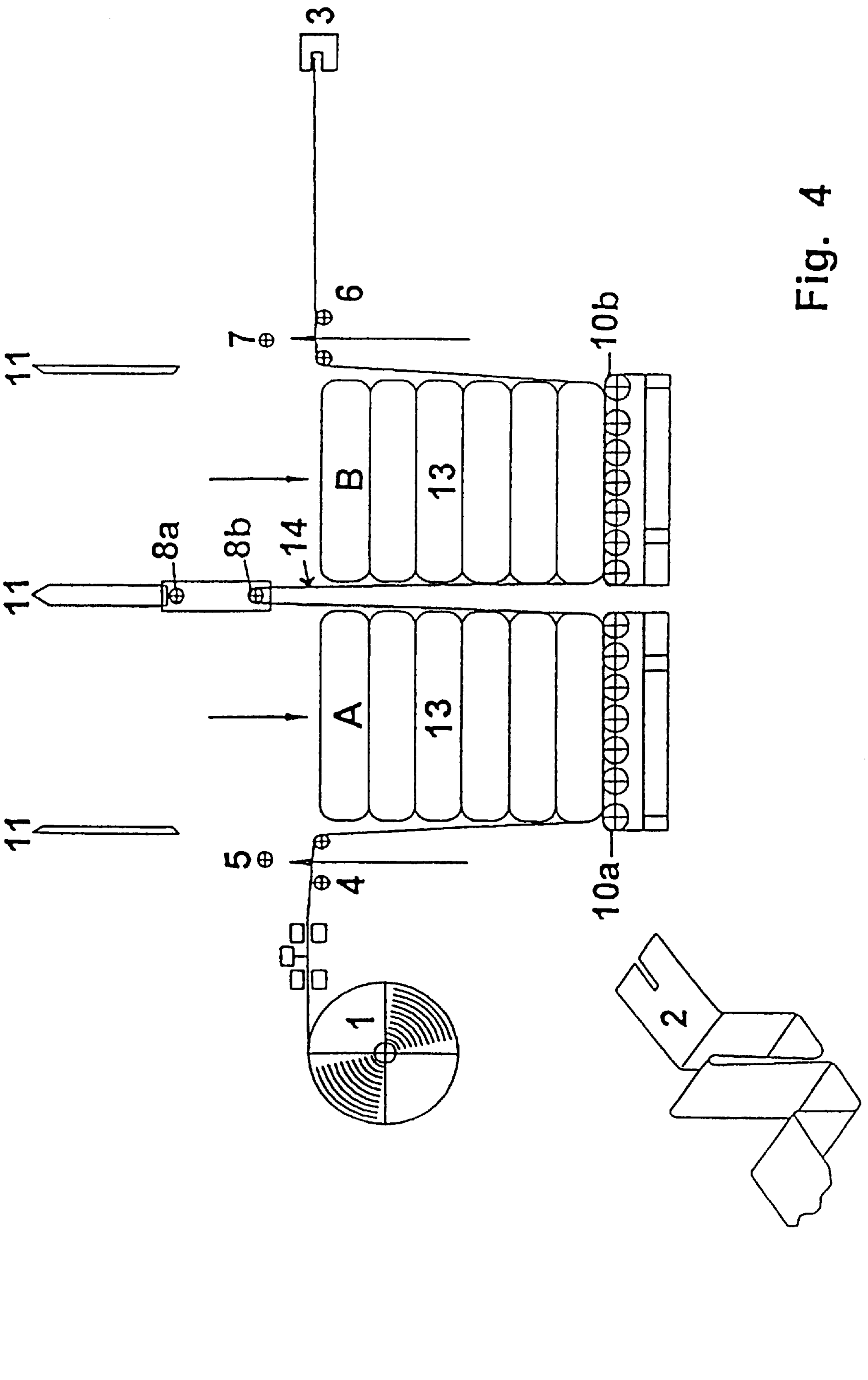
FIG. 4 shows the production step when the last units of goods have been stacked on the sling.

FIG. 4 shows the process step at which stacking of bags is finalized. The belt 2 now surrounds both sides and the bottom of the two stacks of bags 13. A loop 14 of the belt 2 is formed between the two stacks and is held in position by the rod 8*b*. This portion of the belt 2 is pressed together in the transverse direction and a retaining agent is applied (for example, glue might be sprayed into the folds) in order to keep the loop 14 more easily in its desired form (see lower left corner of FIG. 5). The first and second assemblies 10*a,b* have been moved downwards to a lower position than shown in FIGS. 2 and 3, and the belt 2 is stretched out around the two stacks of bags.

Figure 5:
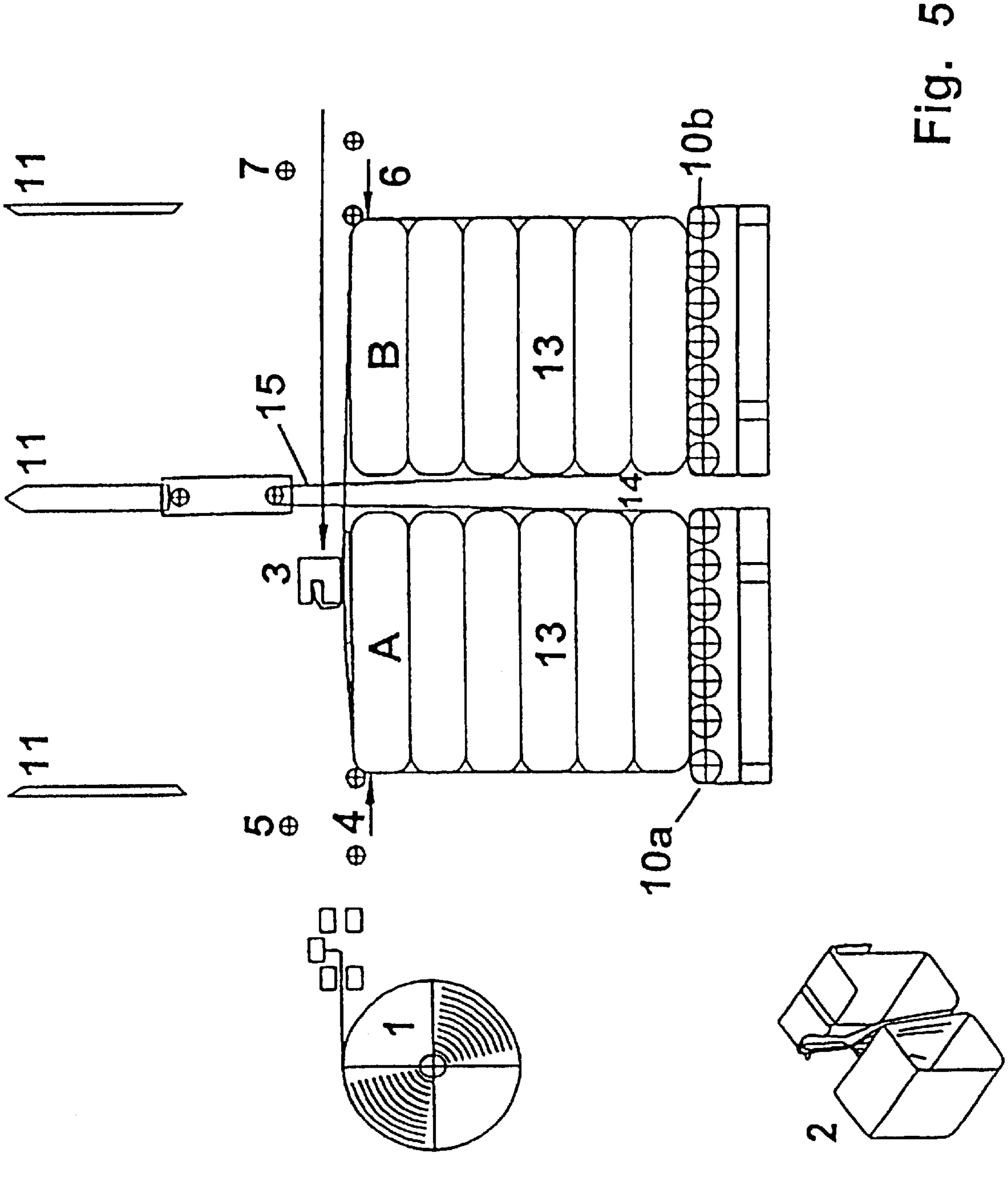
FIG. 5 shows the last step in the production comprising joining the two ends of the belt to form the sling.

FIG. 5 shows the last step of the process of forming a parcel of self-clamping load slings. When the stacking of bags is finalized, the clamping device 3 is moved to the left over the top of the stacks while holding the first end of the belt 2, and joins with the second end of the belt which has been cut away from the continuous supply of belt. During this step of the process, a slit-formed opening has been provided in the belt allowing the upper part of the loop 14 to be positioned above the belt 2. Prior to positioning the upper part of the loop 14 above the belt 2, the loop 14 has been gathered together, transversely, to form a lifting eye 15 at the end of the loop 14. The two ends of the belt 2 are joined by glue, hot melt, sewing or any other suitable joining method (i.e., mechanical fittings). If glue is applied, a plate may be placed on top of the stack A immediately beneath the joint area, and glue can be supplied between the two belt ends where a roll could then press them together to form a permanent joint.

The units of goods or bags can be stacked into the belt in various patterns depending on the size of the units of goods. The type of goods which can be handled according to the invention, can be bags, boxes, etc. and any types of goods which can be loaded and stacked into a sling-formed belt. The main proviso is that the width of the belt is about the same as the width of the stacks of units of goods.

When one parcel of units of goods has been loaded as described above, the whole process can be restarted. The production time for a parcel of bags using the apparatus according to the invention will be 1–3 minutes depending on the size of the parcels and the units of goods.

Figure 6:
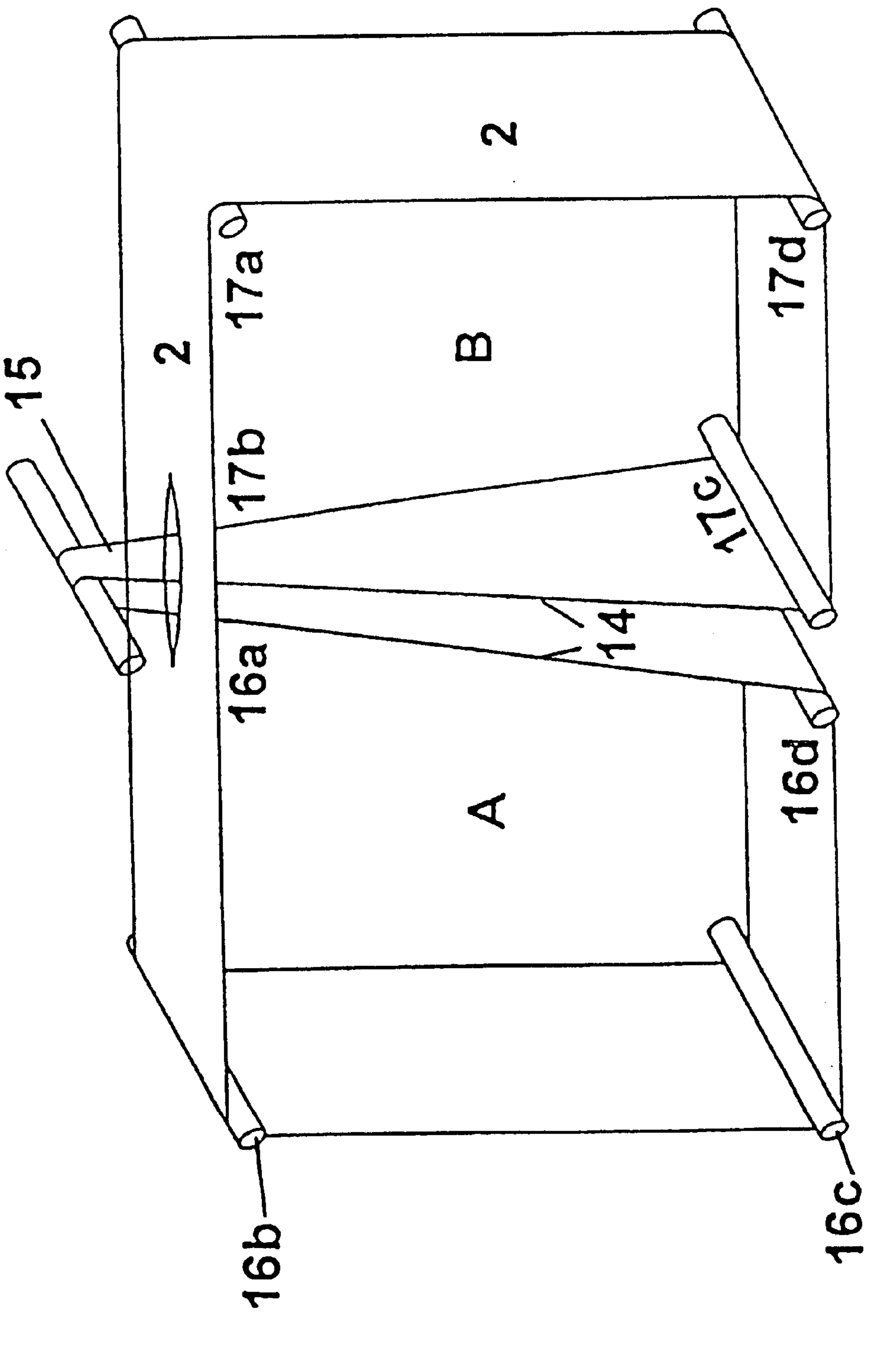
FIG. 6 shows an arrangement for applying a belt-for-med sling to be filled manually with bags.

FIG. 6 shows a special arrangement for manual stacking of bags into a belt-formed sling 2. A first set of rods, including first through fourth rods 16*a*–16*d*, respectively, and a second set of rods, including fifth through seventh rods 17*a*, 17*c* and 17*d*, respectively (an eighth rod can be provided at point 17*b* also), each of the first and second sets of rods being transverse to the belt 2, define the two stacks of bags 13. The belt 2 can be placed over rods 16*a*–*d* and past 16*a* for forming the tapered suspension loop 14 (as shown in FIGS. 5 and 6) and then down past point 17*b* and further around rods 17*c, d* and a around stack B and across stack A to be joined with the other end of the belt 2. A central slit or opening for the suspension loop can be provided in the upper area of the belt 2 in the area between the two stacks A and B. The bags 13 can be loaded manually inside the belt either before or after the two belt ends are joined.

A preformed belt can also be made and supported by an assembly of seven or eight rods after which the bags can be loaded manually into the belt having a central suspension lifting loop as described above. Additional support can be provided by a base plate or a base plate assembly.

The lifting loop (lifting eye) of the prefabricated belt can comprise a pleated part encircled by a retaining agent such as a retaining a(gent such as a sleeve or at least one rope or strap to keep the pleats permanently together. The belt can be made from materials as described above and be in the form of a ready made loop or from a piece of material being joined as described above.

Figure 7:
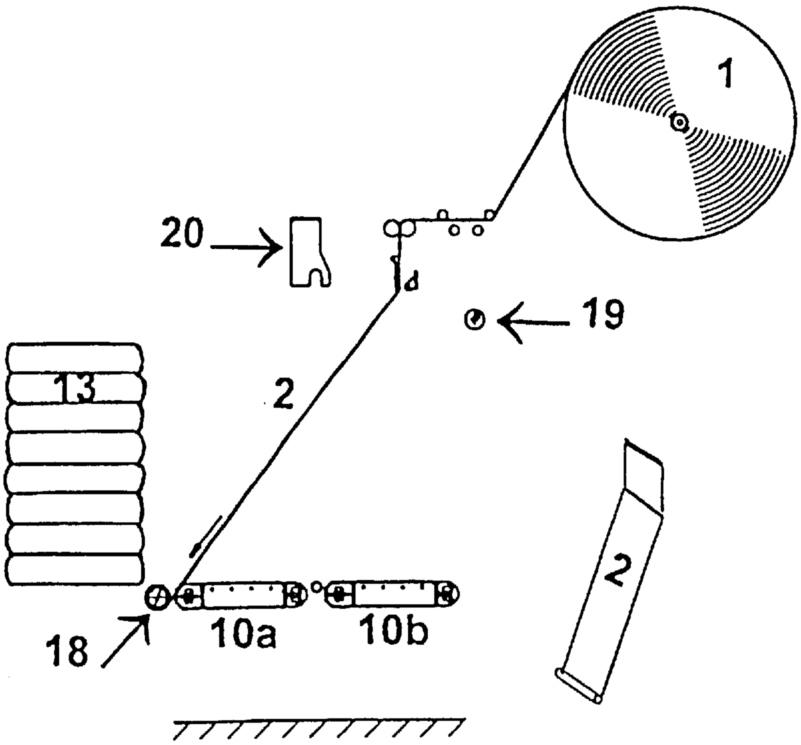
FIG. 7 shows the alternative method of pulling out a predetermined length of the belt material.
Figure 8:
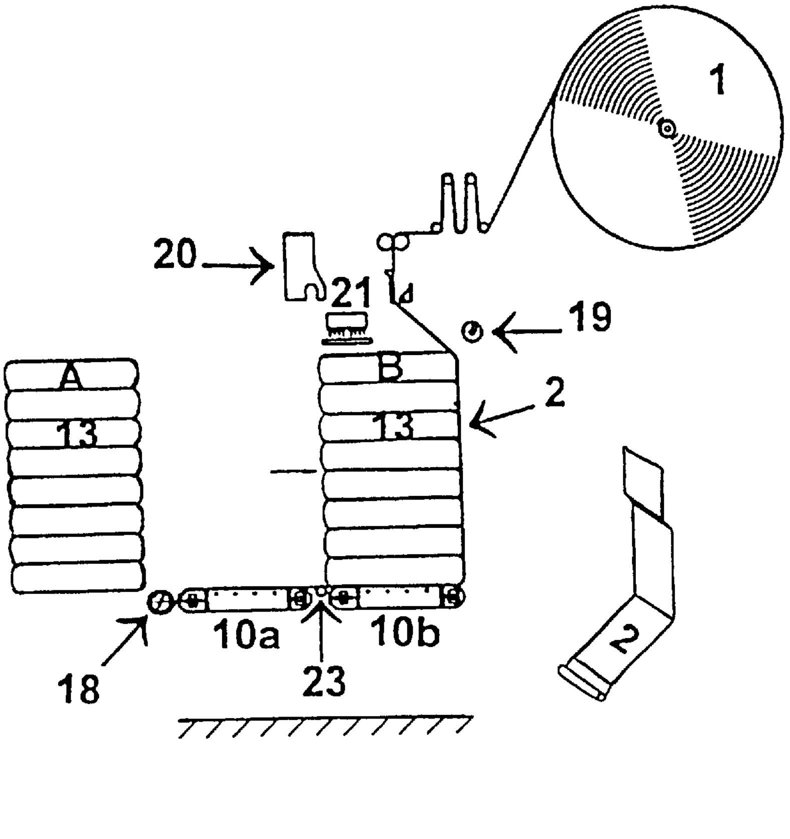
FIG. 8 shows the placement of the first stack of parcels in the belt.
Figure 9:
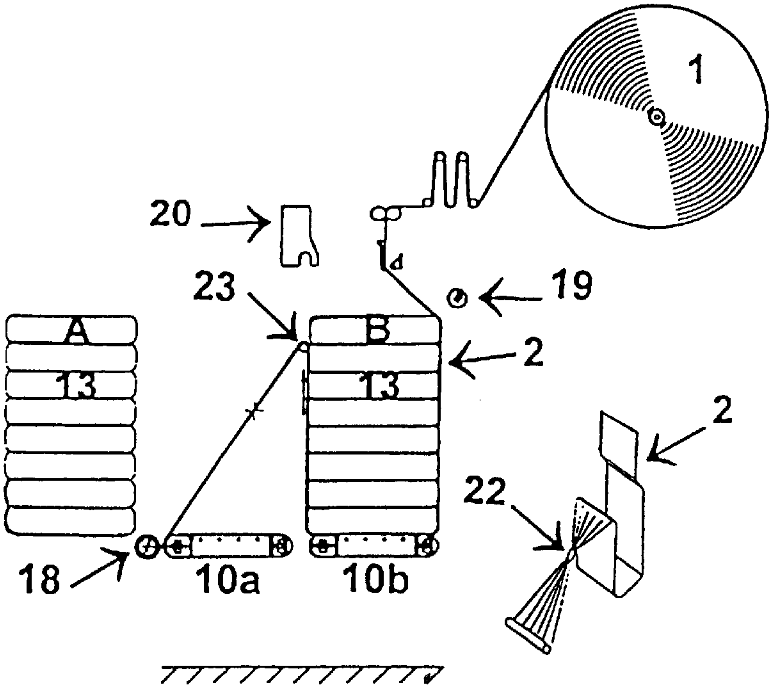
FIG. 9 shows formation of the suspension loop.
Figure 10:
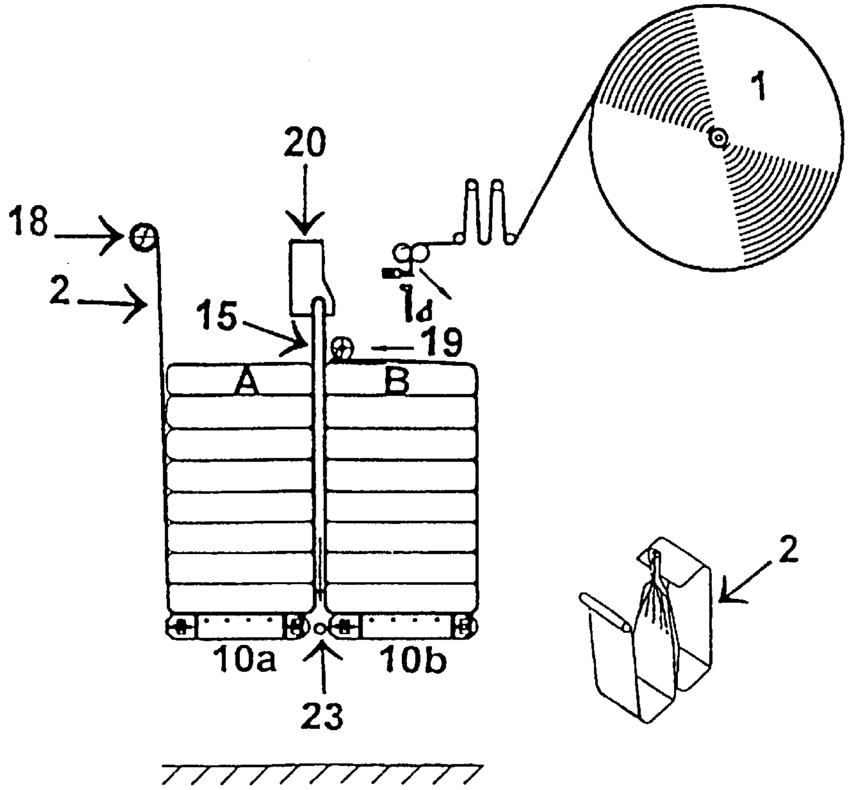
FIG. 10 shows two stacks of goods placed inside the belt.
Figure 11:
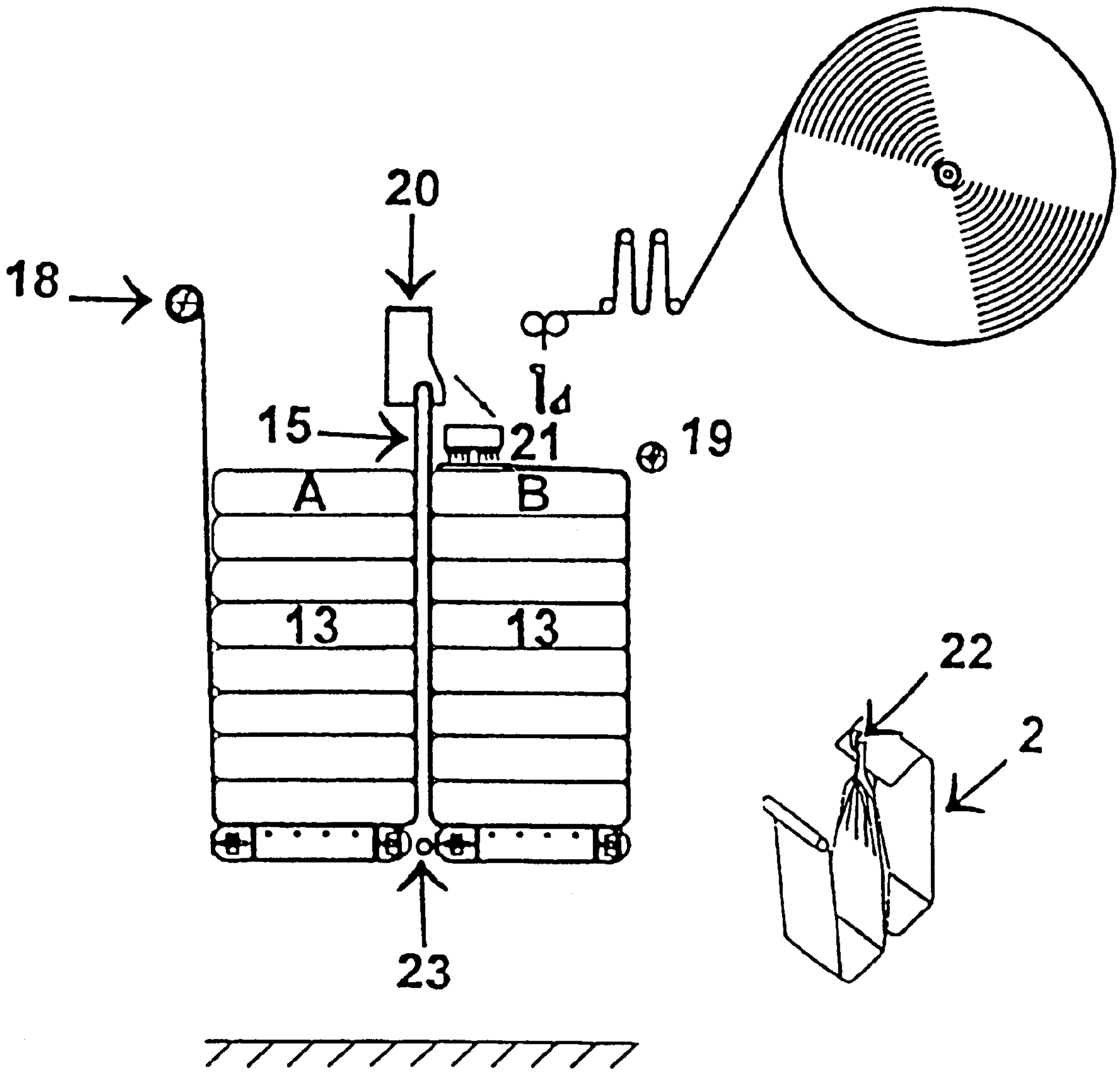
FIG. 11 shows the two stacks of parcels surounded by the belt just before the belt ends are joined together.
Figure 12:
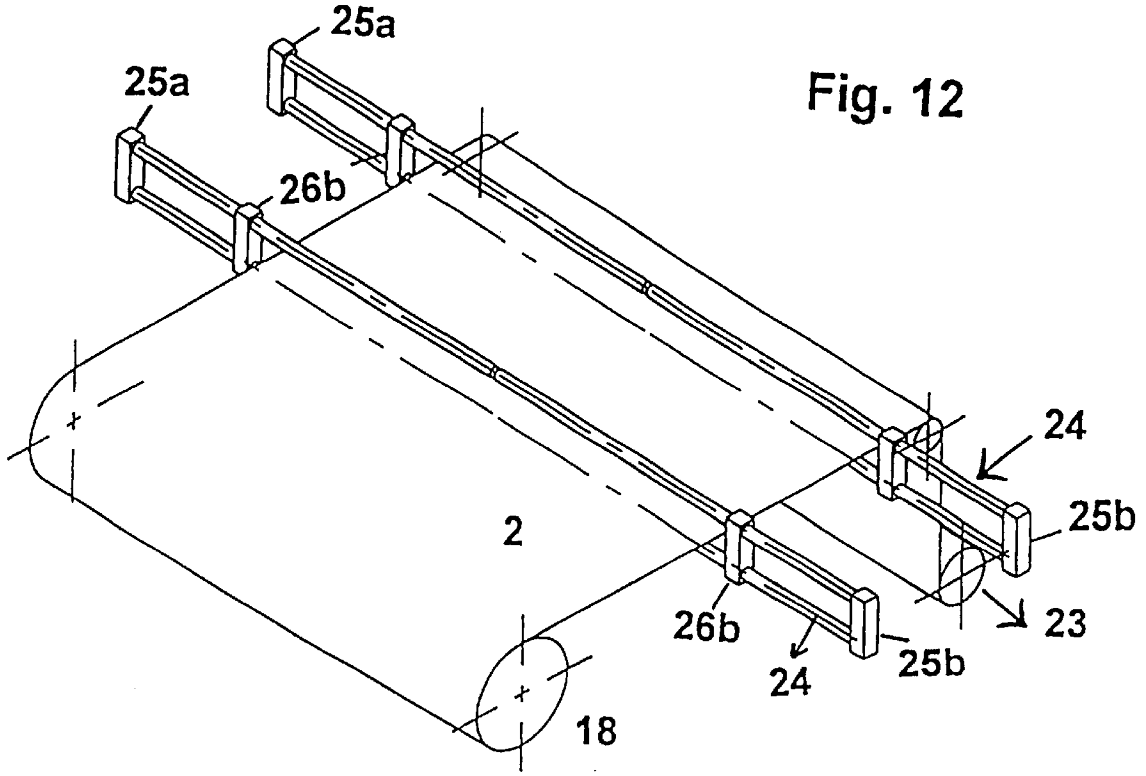
FIGS. 12–14 show a device for pleating part of the suspension loop and forming a sleeve around the pleated part.
Figure 13:
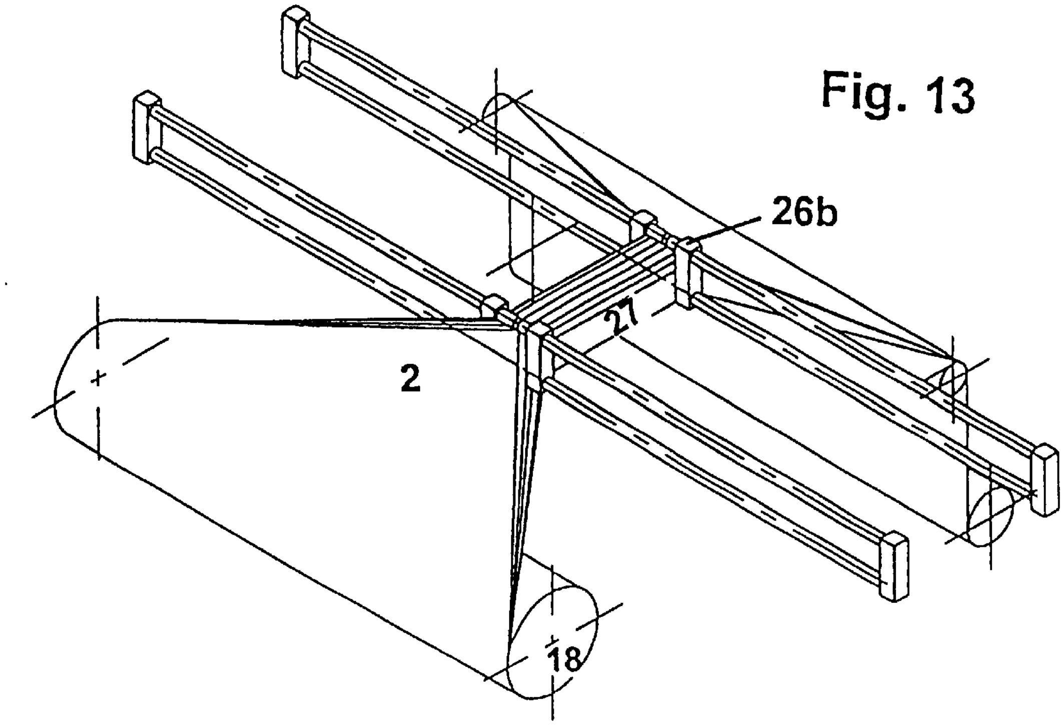
Figure 14:
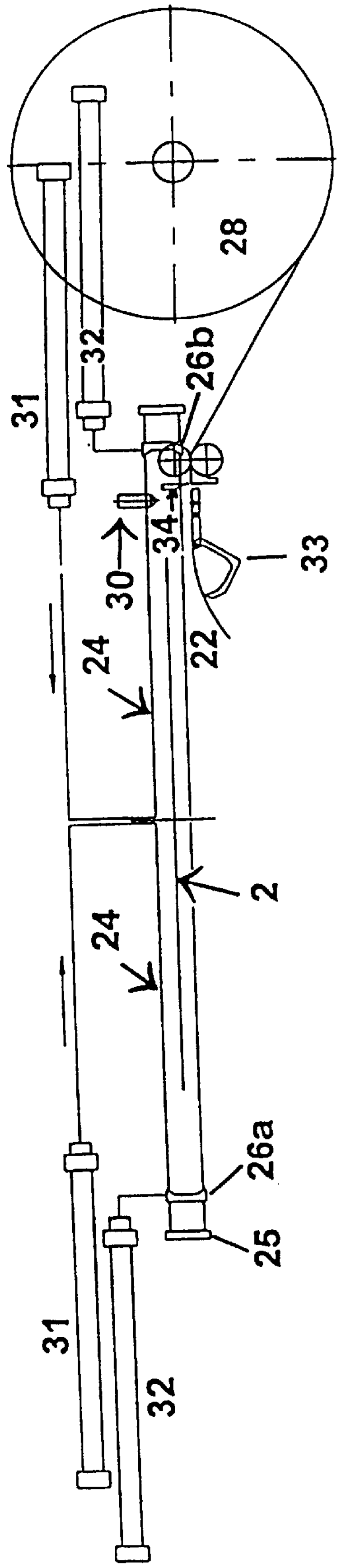

FIG. 7 shows how the belt 2 is secured to a first rod 18 and run up to the belt supply 1 before the first stack of parcels 13 are placed onto the respective first and second roll assemblies 10*a* and 10*b*. In FIG. 8 it is shown that the belt 2 is placed on top of the roll assemblies 10*a* and 10*b* and the first stack B of parcels 13 is placed on 10*b* and its right side is covered by the belt 2. As shown on FIG. 9 the belt 2 is pressed upward along stack B by a second rod 23 placed between the assemblies 10*a* and 10*b*. This is how the central suspension loop 15 is formed and it is pressed and folded together or pleated and then surrounded by a sleeve 22 as shown on the small figure to the right of stack B. (FIG. 9). The stack A can then be placed on the assembly 10*a* and the belt 2 is placed along stack A by moving the first rod 18 upward. The suspension loop is then hoisted up and secured in a clamping device 20 and the second rod 23 can be released and moved back to its initial position between the assemblies 10*a* and 10*b*. As further shown on FIG. 10, a third rod 19 is pressed to the left placing the cut off (first) end of the belt 2 on top of stack B. On FIG. 11 the first stage of joining the belt ends together is shown. Glue or hot melt is supplied to the top layer of the belt by a device 21 whereupon the first rod 18 is moved to the right placing the second end of the belt on top of the first end previously covered with glue, and the two belt ends are pressed together forming a strong joint. The parcel of stacks A and B surrounded by the belt including the tapered central suspension loop 15 is then ready to be transported out of the apparatus and a new parcel of stacks can be made. The stacks A and B can be surrounded by plastic sheet or film, for instance by conventional shrink wrapping, prior to being placed on the roll assemblies 10*a,b*. FIG. 12–14 shows how the belt 2 can be pleated and a sleeve 22 can be secured around the pleated loop 15 according to the invention. Pleating and placement of a sleeve 22 around the central part of the pleated part will be performed prior to the operation shown in FIG. 9. Rods 18 and 23 will be at the same height, placing the belt 2 in a horizontal position during pleating. The belt 2 is first placed between two sets of guiding bars 24 as shown on FIG. 12. The bars 24 are kept apart a predefined distance by end pieces 25*a, b,* and this distance defines the height of the pleats 27 (FIG. 13). Each set of bars 24 consists of two parts, one on each side of the belt 2, and will be moved out of the belt area when pleating and placement of the sleeve 22 are completed. On the bars 24 there are pieces 26*a,b* which can be moved along the bars 24. When piece 26*a* is moved towards piece 26*b,* the belt 2 is pleated and the central pleated part 27 is ready for encirclement by a retaining agent such as a sleeve 22. This is further shown on FIG. 14 where the sleeve material from a supply 28 therefore extends into a curved or buckled device 33. On FIG. 14 there are shown pressure cylinders 31 and 32 for horizontal movement of the bars 24 and the pleating pieces 26*a,b* respectively. The device 33 is secured to piece 26*b* and has a width being substantially the same as that of the pleated part 27. Glue or hotmelt is supplied to the sleeve material which is cut by a knife or similar device 34 to a pre-defined length before the pleating process stalls. When the pleating process is finalized, the device 33 will be immediately below the pleated part 27 (FIG. 13). The device 33 will then be pressed around part 27 and this part will thereby be encircled by the sleeve 22.

EXAMPLE 1

These examples show the preferred way of joining the two belt ends by glue or adhesive. The example further comprises tests performed for evaluating the strength of such joints. A test piece of polypropylene cloth being treated with irradiation (corona) has a width of 100 mm, and the overlap area for the two cloth ends was about 15 cm. A thermosetting adhesive, for instance polyurethane, was applied to one of the cloth ends in 4 mm stripes across the cloth, and 4–6 strips were applied. The temperature of the adhesive was above its melting point. During the test the adhesive was supplied at 180° C. The distances between the stripes were 30 mm. Immediately after application of the adhesive, the second cloth part was placed on top of the first part and they were pressed together for about 10 sec. Then the joint was exposed to a tension test at 60° C. and at a tension rate of 200 mm/min. Several tests were performed until rupture. All samples ruptured in the cloth, the adhesive stripes did not yield or rupture. Various thermosetting adhesives were tested and they all passed the tensile strength test giving a safety factor of 7:1., i.e., parcels weighing 1600 kg can be exposed to a tension of at least 11200 kg without rupture of the joint or cloth. If the cloth fabric was not corona treated, glued joints glued together as described above did not pass the test. Based on these tests a suspension belt having a width of 100 cm and being corona treated could be safely joined by thermosetting adhesive. The belt ends could be overlapping in an area of 5–10 cm and 2–6 stripes of adhesive would be sufficient.

By the present invention the inventors have succeeded in developing parcels of stacks of units that can be surrounded by a suspension loop giving safe and economic handling of such parcels. An apparatus essential for the economy of such a concept has also been developed and the preferred way of forming and joining the applied belt together has proved to be important for commercializing the concept.

We claim:

1. A belt device for forming a packaging arrangement including at least one pair of stacks of goods, said belt device comprising:

- a single unitary belt to be wrapped around the stacks of goods and having a width substantially equal to a transverse width of each of the stacks of goods to be wrapped, said belt having a first end permanently secured to a second end so as to form a closed-loop sling, said closed-loop sling having:
  - an upper portion for covering an upper surface of the stacks of goods and having a central opening;
  - a tapered central suspension portion for extending upwards between the stacks of goods; and
  - a lifting eye at an upper end of said central suspension portion and extending through said central opening in said upper portion, said lifting eye being formed as a pleat by pressing together sides of said belt in a transverse direction of said sling, said closed-loop sling including a retaining agent for holding said pleat of said lifting eye together.

2. The belt device of claim 1, wherein said lifting eye has transverse folds, said retaining agent comprising an adhesive material in said transverse folds.

3. The belt device of claim 1, wherein said first end is permanently secured to said second end by one of a sewn joint, a glued Joint, a weld joint, a hot melt joint, and mechanical fittings.

4. The belt device of claim 1, wherein said retaining agent comprises a sleeve surrounding said pleat.

5. The belt device of claim 1, wherein said retaining agent comprises one of a rope and a strap encircling said pleat.

6. A method of forming a packaging arrangement using a closed-loop belt and stacks of goods, said method comprising:

- forming a closed-loop belt having a width substantially equal to a transverse width of each of the stacks of goods to be wrapped by permanently securing a first end of a belt to a second end such that the closed-loop belt has an upper portion including a central opening;
- arranging the closed-loop belt on a first set of rods so as to form a first loop;
- arranging the closed-loop belt on a second set of rods spaced apart from the first set of rods so as to form a second loop, the first set of rods and the second set of rods being transverse to the closed-loop belt, the closed loop belt being arranged on the first set of rods and the second set of rods such that a central suspension portion of the closed-loop belt extends upwards between the first set of rods and the second set of rods and extends through the central opening in the upper portion so that the central suspension portion becomes tapered;
- forming a lifting eye at an upper end of the central suspension portion extending through the central opening, the lifting eye being formed as a pleat by pressing together sides of the closed-loop belt in a transverse direction of the sling;
- applying a retaining agent to the lifting eye to hold the pleat together;
- loading a first stack of goods into the first loop formed by the first set of rods; and
- loading a second stack of goods into the second loop formed by the second set of rods.

7. The method of claim 6, wherein the first set of rods includes a first rod, a second rod, a third rod, and a fourth rod, and wherein the second set of rods includes a fifth rod, a sixth rod, a seventh rod and the first rod.

8. The method of claim 6, wherein the pleat of the lifting eye has transverse folds, said applying of the retaining agent to the lifting eye comprises applying an adhesive material in the transverse folds of the pleat.

9. The method of claim 6, wherein said applying of the retaining agent to the lifting eye comprises encircling the pleat with one of a rope and a strap.

* * * * *